US010854175B2

(12) United States Patent
Zurbrick et al.

(10) Patent No.: US 10,854,175 B2
(45) Date of Patent: Dec. 1, 2020

(54) MONITORING SUPPORT ELEMENT STRAIN TO DETERMINE REAL-TIME POSITIONAL RELATIONSHIPS BETWEEN POSITIONALLY SENSITIVE DEVICE COMPONENTS

(71) Applicant: Microsoft Technology Licensing, LLC, Redmond, WA (US)

(72) Inventors: William Steven Zurbrick, Santa Clara, CA (US); Brian J. Toleno, Cupertino, CA (US); Marianne E. Laford, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/353,736

(22) Filed: Mar. 14, 2019

(65) Prior Publication Data

US 2020/0294474 A1   Sep. 17, 2020

(51) Int. Cl.
*G09G 5/38* (2006.01)
*G01L 1/22* (2006.01)
(Continued)

(52) U.S. Cl.
CPC .............. *G09G 5/38* (2013.01); *G01L 1/2206* (2013.01); *G01L 5/161* (2013.01);
(Continued)

(58) Field of Classification Search
CPC . G06F 3/013; G06F 3/011; G06F 3/01; G06F 3/012; G06F 1/1616; G06F 1/1652;
(Continued)

(56) References Cited

U.S. PATENT DOCUMENTS 8,576,143 B1 * 11/2013 Kelly .................. G02B 27/017
345/8
2013/0044240 A1 * 2/2013 Leskela ................ H04N 5/2258
348/239
(Continued)

FOREIGN PATENT DOCUMENTS

JP       2013072839 A1    4/2013

OTHER PUBLICATIONS

Li, et al., "Facial Performance Sensing Head-Mounted Display", In Journal of ACM Transactions on Graphics, vol. 34, Issue 4, Aug. 9, 2015, 9 Pages.
(Continued)

*Primary Examiner* — Sanjiv D. Patel
(74) *Attorney, Agent, or Firm* — Newport IP, LLC; Mike R. Cicero

(57) ABSTRACT

A computing device monitors support element strain to enable deployment of positionally-related components in conjunction with one another while the real-time positional relationship between these positionally-related components fluctuates during operation. An exemplary computing device includes a first component and a second component that are both mounted to a support element. The computing device may be subjected to mechanical loading during operation which may induce strain into the support element thereby affecting the nominal positioning between the positionally-related components. The computing device includes a displacement sensor to generate displacement data that is indicative of a real-time positional relationship between the components. This real-time positional relationship may be compensated while implementing desired functionality. In this way, the computing device can be subjected to the stresses and strains that result from many typical use cases while the positional relationship between the sensor com- (Continued)

ponents is actively monitored and compensated for to implement desired functionality.

20 Claims, 7 Drawing Sheets

(51) Int. Cl.
*G01L 5/161* (2020.01)
*G02B 27/01* (2006.01)

(52) U.S. Cl.
CPC .... *G02B 27/0172* (2013.01); *G02B 2027/014* (2013.01); *G02B 2027/0123* (2013.01); *G09G 2340/0464* (2013.01)

(58) Field of Classification Search
CPC .......... G06F 1/1681; G06F 3/0416; G06F 2203/04102; G02B 2027/0178; G02B 27/017; G02B 27/0172; G02B 2027/0187; G09G 2354/00; G09G 2320/02; G09G 2320/06; G09G 2340/14; G09G 2380/02; G09G 5/003; G09G 2380/14; H04N 13/344

See application file for complete search history.

(56) References Cited

U.S. PATENT DOCUMENTS

| | | | |
|---|---|---|---|
| 2014/0055429 A1* | 2/2014 | Kwon | G06F 1/1643 345/204 |
| 2014/0062841 A1 | 3/2014 | Ishikawa et al. | |
| 2015/0192481 A1* | 7/2015 | Nguyen | G09G 3/20 345/206 |
| 2016/0041048 A1* | 2/2016 | Blum | G06F 1/3265 73/774 |
| 2016/0216760 A1 | 7/2016 | Trutna et al. | |
| 2017/0249041 A1 | 8/2017 | Moller et al. | |
| 2018/0061034 A1 | 3/2018 | Zhao et al. | |
| 2018/0316910 A1* | 11/2018 | Kashibuchi | H04N 13/167 |
| 2019/0068853 A1* | 2/2019 | Price | G06T 7/593 |

OTHER PUBLICATIONS

Burcher, Jack, "Apple Invents an Optical System for a Future VR and AR Headset", Retrieved From: https://www.patentlyapple.com/patently-apple/2018/02/apple-invents-an-optical-system-for-a-future-vr-and-ar-headset.html, Feb. 8, 2018, 6 Pages.

"International Search Report and Written Opinion Issued in PCT Application No. PCT/US2020/020577", dated: Aug. 14, 2020, 17 Pages.

* cited by examiner

MONITORING SUPPORT ELEMENT STRAIN TO DETERMINE REAL-TIME POSITIONAL RELATIONSHIPS BETWEEN POSITIONALLY SENSITIVE DEVICE COMPONENTS

BACKGROUND

Modern computing devices include groupings of components are deployable in conjunction with one another to implement complex functionalities. Individual components in such groupings are often positionally-related to each other in the sense that implementing certain functionality requires precise knowledge of a positional relationship therebetween.

As an example, a computing device may include a structured light system that utilizes a projector to emit a known pattern of invisible light into a real-world environment and a sensor to detect reflections of this known pattern. So long as the positional relationship between the projector and the sensor is precisely known, structured light systems can accurately calculate three-dimensional (3D) scene information based on how the reflections of the known pattern are deformed from the perspective of the sensor. However, even slight deviations from the "known" positional relationship can negatively impact the accuracy with which the calculated 3D scene information represents the real-world environment.

As another example, a Near-Eye-Display (NED) device may include a support element to maintain a display at a precise position with respect to a user's eyes when the NED device is worn by the user. During operation, the NED device causes the display to project computer generated images toward the user's eye to augment the user's perception of the real-world environment (e.g. to generate a mixed-reality experience). Due to anatomical limitations regarding how the eyes receive light, even slight movements of the display may cause displayed imagery to become misplaced or even imperceptible to the user.

For these reasons, positionally-related components are typically mounted on dedicated support structures that are designed to maintain a nominal positional relationship therebetween. Unfortunately, during practical real-life use scenarios, modern computing devices frequently experience some level of mechanical loading which, in turn, induces strain into these dedicated support structures. Thus, even when the nominal positional relationship is precisely identified through calibration, modern computing devices are mechanically loaded, and therefore strained, during use which renders it impractical to adequately maintain the nominal relationship that is preidentified via calibration.

It is with respect to these and other considerations that the disclosure made herein is presented.

SUMMARY

Technologies described herein involve monitoring support element strain to determine real-time positional relationships between positionally sensitive components. The disclosed techniques enable computing devices to deploy positionally-related components in conjunction with one another to implement complex functionality—even as the real-time positional relationship between these positionally-related components fluctuates during operation. An exemplary such computing device may include a first component and a second component that are both mounted to a support element. Although the first component and the second component may be mounted at a nominal distance and/or angle from one another, for reasons described above it may be impractical to maintain this nominal positioning during operation. Specifically, the computing device may be subjected to mechanical loading during operation which may induce strain into the support element thereby affecting the nominal positioning between the positionally-related components. Accordingly, the computing device may further include a displacement sensor to generate displacement data that is indicative of a real-time positional relationship between the components. Then, this real-time positional relationship may be compensated for in order to effectively implement certain functionality. In this way, the computing device can be subjected to the stresses and strains that result from many typical use cases (e.g., the support element may expand and/or contract due to thermal stresses)—all while the positional relationship between the sensor components is actively monitored and compensated for to implement important functions.

In an example embodiment, a system includes a sensor assembly that generates tracking data in accordance with an environmental-tracking function (e.g., an algorithm that is usable for mapping a real-world environment). Generation of the tracking data may include deploying a first sensor component in conjunction with a second sensor component. As a specific but non-limiting example, the first sensor component may be a projector for emitting structured light and the second sensor component may be an image sensor (e.g., a complementary metal-oxide-semiconductor (CMOS) camera) for detecting reflections of the structured light which have been distorted by objects within the real-world environment. It will be appreciated that in structured light technologies (and other environmental-tracking technologies for that matter), the accuracy with which calculated 3D scene information represents the actual real-world environment depends on the precision with which a positional relationship between sensor components (e.g., a projector and image sensor) is known. This is because this positional relationship typically needs to be accommodated for in the algorithms used to implement the environmental-tracking functionality.

For this reason, the system also includes one or more strain gauges to generate strain data that is indicative of a real-time positional relationship between the first sensor component and the second sensor component. The strain gauge(s) may be mechanically coupled to a support element onto which the first sensor component and the second sensor component are commonly mounted. The support element may be, for example, a homogenous metallic alloy, a carbon fiber reinforced polymer (CFRP) that includes a cured epoxy resin having a plurality of carbon fibers embedded therein, or any other material or combination of materials that is suitable for supporting device componentry. As the support element is subjected to mechanical stress (force per unit area, e.g., Pascals=Newton/$m^2$) a commensurate amount of strain (e.g., deformation) is induced into the support element. Due to being coupled to the support element, the strain gauge(s) is similarly subjected to mechanical stress which causes one or more measurable properties (e.g., electrical resistance in Ohms) to vary by an amount that is indicative of how much strain is induced into the support element.

With respect to computing capabilities, the system also includes a controller that communicates with the sensor assembly and the strain gauge(s) to perform environmental-tracking functionality while accommodating in real-time for changes in the positional-relationship between the sensor components. For example, since the accuracy of the calculated 3D scene information requires that the environmental-tracking function precisely account for the current positional-relationship between the sensor components, the controller may include computer-executable instructions to periodically and/or continuously update the environment-tracking function as the positional-relationship fluctuates. For example, suppose that accurate mapping of the real-world environment requires that the algorithms used to implement the environmental-tracking functionality be modified to reflect a distance and/or angle between the first sensor component (e.g., the projector for emitting structured light) and the second sensor component (e.g., image sensor). Under these circumstances, the controller may receive the tracking data from the sensor assembly and also the strain data from the strain gauge(s). Upon receiving the strain data, the controller may analyze the strain data to determine the current positional-relationship between the sensor components (e.g., in terms of distance, position in space, and/or angle between sensor components). Based on the analysis of the strain data, the controller may then update the environmental-tracking function to dynamically generate a real-time environment-tracking function that accounts for the real-time positional relationship between the first sensor component and the second sensor component.

After analyzing the strain data to determine and account for the real-time positional relationship between sensor components, the controller may map the real-world environment by analyzing the tracking data with respect to the real-time environment-tracking function. In this way, even when mechanical and/or thermal stress induces strain into the support element that is supporting the sensor components, the systems described herein will measure and analyze this strain so as to actively monitor the real-time positional relationship between sensor components so that the environmental-tracking functionality remains highly accurate.

As used herein, the term "sensor components" may be used to refer to any component that is used for the purpose of sensing or tracking properties of a real-world environment. Accordingly, in the context of structured light technologies, a "light" projector that emits a known pattern of invisible light may aptly be described as a sensor component.

As used herein, the term "real-time" may be used to refer to processes that occur and/or information that is updated in association with relatively short time intervals. For example, a real-time environmental-tracking function may refer to an algorithm that is frequently updated (e.g., every one-minute, every 10 seconds, every 1 second, every one-tenth of one-second) to account for a newly measured positional relationship between sensor components. The term real-time as used herein and the claims that follow is not intended to imply the data is transmitted instantaneously.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

DETAILED DESCRIPTION

The following Detailed Description describes technologies for monitoring support element strain to determine real-time positional relationships between positionally sensitive components. The disclosed techniques enable computing devices to deploy positionally-related components in conjunction with one another to implement complex functionality—even as the real-time positional relationship between these positionally-related components fluctuates during operation. An exemplary such computing device may include a first component and a second component that are both mounted to a support element. Although the first component and the second component may initially be mounted at a nominal distance and/or angle from one another, it may be impractical to maintain this nominal positioning during operation. For example, the support element may be subjected to mechanical and/or thermal stress during operation which may induce strain into the support element thereby affecting the nominal positioning between the positionally-related components. Accordingly, the computing device may further include a displacement sensor to generate displacement data that is indicative of a real-time positional relationship between the positionally-related components. Then, this real-time positional relationship may be compensated for in order to effectively implement certain functionality. In this way, the computing device can be subjected to the stresses and strains that result from many typical use cases (e.g., the support element may expand and/or contract due to thermal stresses)—all while the positional relationship between the sensor components is actively monitored and compensated for to implement important functions.

Figure 1:
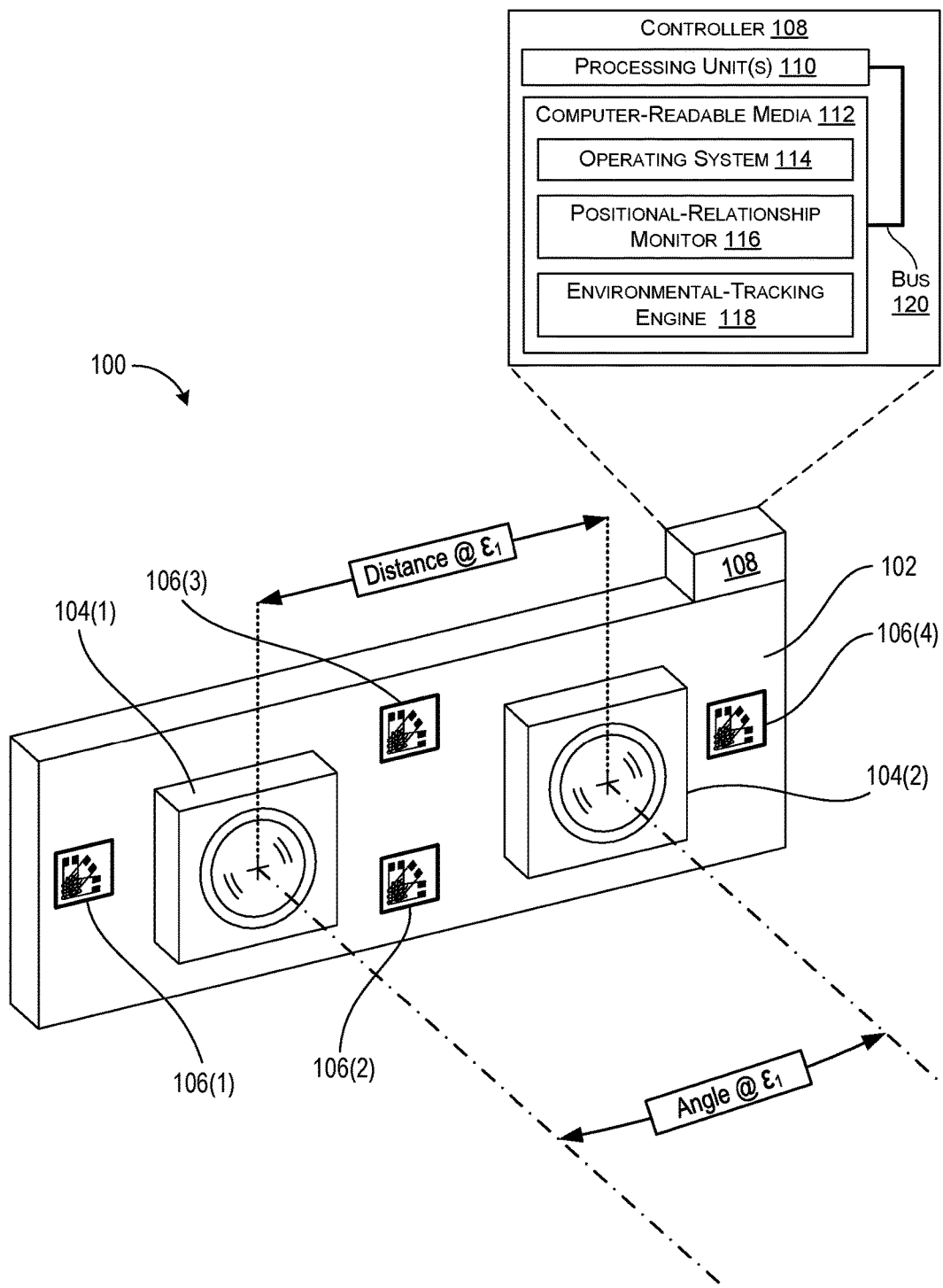
FIG. 1 is a perspective view of an exemplary system for monitoring strain that is induced into a support element to determine real-time positional relationships between positionally sensitive components.

FIG. 1 is a perspective view of an exemplary system 100 for monitoring strain that is induced into a support element 102 to determine real-time positional relationships between positionally sensitive components 104. As shown in FIG. 1, the system 100 includes a first component 104(1) and a second component 104(2) that are both mounted to a support element 102. The support element 102 may be, for example, a homogenous metallic alloy, a carbon fiber reinforced polymer (CFRP) that includes a cured epoxy resin having a plurality of carbon fibers embedded therein, or any other material or combination of materials that is suitable for supporting device componentry.

The positionally sensitive components 104 may be sensor components that are deployed in conjunction with one another to generate tracking data in accordance with an environmental-tracking function. As a specific but non-limiting example, the first component 104(1) may be a projector and the second component 104(2) may be an image sensor. The projector may emit a known pattern of structured light into the real-world environment and the image sensor may include a complementary metal-oxide-semiconductor (CMOS) element that detects reflections of the structured light. The tracking data may represent how these detected reflections are distorted from the perspective of the image sensor and may be analyzed using an algorithm to calculate three-dimensional (3D) scene information about the real-world environment. It will be appreciated that in structured light technologies (and other environmental-tracking technologies for that matter), the accuracy with which calculated 3D scene information represents the actual real-world environment depends on the precision with which a positional relationship between positionally sensitive components 104 is known. This is because this positional relationship typically needs to be accommodated for in the algorithms used to implement the environmental-tracking functionality.

The system 100 shown in FIG. 1 further includes one or more displacement sensors 106 that generate displacement data indicating how the positionally sensitive components 104 move and/or rotate with respect to one another. In the illustrated embodiment, the one or more displacement sensors 106 include four strain gauges that are disposed at four different locations so as to form a strain gauge array that at least partially surrounds one or both of the positionally sensitive components 104. The first stain gauge is labeled 106(1), the second strain gauge is labeled 106(2), and so on. It will be appreciated that the strain gauges are mechanically coupled to the support element 102 in a manner so as to undergo stresses (force per unit area, e.g., Pascals=Newton/m$^2$) and/or strains along with the support element 102. It will further be appreciated by one skilled in the art that when the strain gauges are subjected to stress and/or strain, one or more measurable properties (e.g., electrical resistance in Ohms) of the strain gauges vary by an amount that is indicative of how much stress and/or strain the strain gauges are currently experiencing.

In some embodiments, the displacement sensors 106 may be mechanically coupled to the support element 102 by use of a suitable adhesive such as, for example, cyanoacrylate or cellophane tape. Additionally, or alternatively, the displacement sensors 106 may be embedded into the support element 102 during a manufacturing process such as, for example, a lamination process and/or an injection molding process. As used herein, the term "displacement sensor" refers to any device that is usable to measure and/or generate a signal that is indicative of a displacement of a device component. The displacement may be measured with respect to some reference node—which may be a displacement sensor itself or any other suitable point in space against which displacements are to be measured. Exemplary types of displacement sensors include, but at not limited to, strain gauges, capacitive displacement sensors, inductive sensors, and so on. As used herein, the term "strain gauge" refers to any device that is usable to measure and/or generate a signal that is indicative of stain (a unitless measurement commonly denoted as c in deformation mechanics calculations) on an object. Exemplary types of strain gauges include, but at not limited to, photoelectric gauges, metallic wire-type strain gauges, semiconductor strain gauges, thin-film strain gauges, bonded resistance gauges, and so on. Based on the foregoing definitions it should be therefore that within the context of this disclosure the term "displacement sensor" is inclusive of the term "strain gauge."

As further illustrated in FIG. 1, the system 100 also includes a controller 108 that is communicatively coupled to the displacement sensors 106 and one or more of the positionally sensitive components 104. The controller 108 includes one or more logic devices and one or more computer memory devices storing instructions executable by the logic device(s) to accommodate in real-time for changes in the positional-relationship between the positionally sensitive components 104 while performing functionality uses algorithms that mathematically account for the positional-relationship between the positionally sensitive components 104 (e.g., environmental tracking using structured light, stereo vision, etc.). The controller 108 may include one or more processing units 110, one or more computer-readable media 112 for storing an operating system 114, a positional-relationship monitor 116, and an environmental tracking engine 118. The components of the system 100 are operatively connected, for example, via a bus 120, which can include one or more of a system bus, a data bus, an address bus, a PCI bus, a Mini-PCI bus, and any variety of local, peripheral, and/or independent buses.

The positional-relationship monitor 116 may receive the displacement data from the displacement sensors 104 and may analyze this displacement data to determine the current positional-relationship between the positionally sensitive components 104. In the illustrated example in which the displacement sensors 104 are strain gauges, it can be appreciated that the displacement data may be in the form of an electrical resistance measurement that is taken by the positional-relationship monitor 116 via individual strain gauges. Each electrical resistance measurement may be indicative of an amount of strain that is currently present within the support element 102 at the location of the corresponding strain gauge is coupled thereto.

The positional-relationship between the positionally sensitive components 104 may be determined in terms of distance between the positionally sensitive components 104. Additionally, or alternatively, the positional-relationship between the positionally sensitive components 104 may be determined in terms of angle between the positionally sensitive components 104. As illustrated, the support element 102 is shown at a first strain state ($\varepsilon_1$) that results in the first component 104(1) being a particular distance from the second component 104(2). As further illustrated, the first strain state ($\varepsilon_1$) of the support element 102 results in the first component 104(1) being at a particular angular offset from the second component 104(2).

In some embodiments, the positional-relationship monitor 116 receives strain data from individual ones of the strain gauges and uses continuum mechanics to model the mechanical behavior of the support element 102 based on the strain data. For example, the positional-relationship monitor 116 may mathematically model the shape of the support element 102 based on the measured strains. The resulting model of the shape may reveal the real-time positional relationship between the first component 104(1) and the second component 104(2).

Following the analysis of the displacement data, the environmental-tracking engine 118 may then update the environmental-tracking function to dynamically generate a real-time environment-tracking function. For example, the environmental-tracking engine 118 may update various parameters and/or variables of a base environmental-tracking function to account for any changes in the positional-relationship between the sensor components 104. As used herein, the term "real-time environment-tracking function" refers to an environment-tracking function (e.g., an algorithm that is usable for mapping a real-world environment) that accounts for the real-time positional relationship between the first component 104(1) and the second component 104(2).

Additionally, or alternatively, the environmental-tracking engine 118 may select the real-time environment-tracking function from a plurality of different environment-tracking functions that individually correspond to different strain states. For example, as described in more detail below with respect to FIG. 6, the system 100 may undergo a calibration process during which the support element 102 is intentionally placed in a plurality of different strain states. While in each different strain state, the system 100 may be calibrated against some known environment. During this calibration process, an environment-tracking function that is specific to each strain state may be generate. Then, during operation, the environmental-tracking engine 118 may select the particular environment-tracking function that was generated for a strain state that most closely matches a current strain state. As a specific example, during a calibration process the system 100 may be mechanically and/or thermally stressed so as to cause one-thousand different strain states. At each strain state, the system 100 may be fully calibrated by causing generation of tracking data against a known environment (e.g., a known pattern on a flat surface at a known depth). Then, during operation the displacement data may be monitored in real-time and used to select calibration parameters from the calibration strain state that most closely matches the current strain state. These selected calibration parameters may be used to generate and/or select an appropriate real-time environment-tracking function.

After analyzing the displacement data to determine and account for the real-time positional relationship between sensor components 104, the controller 108 may generate mapping data using the real-time environment-tracking function and the tracking data. The mapping data may be dimensionally representative of the real-world environment. For example, the mapping data may be in the form of a 3D point cloud that defines hundreds or even thousands of points in space that fall on various physical objects that are being tracked. In this way, even when mechanical and/or thermal stress induces strain into the support element 102 that is supporting the positionally sensitive components 104, the system 100 described herein will measure and analyze this strain so as to actively monitor the real-time positional relationship between positionally sensitive components 104. Thus, the environmental-tracking functionality of the system 100 remains highly accurate even under mechanical and/or thermal loading situations that would render existing systems incapable of performing environmental-tracking functionality.

The controller may then expose an environment-tracking application programming interface (API) to provide the mapping data to one or more applications and/or are in communication with the system 100. For example, in an implementation in which the system 100 is incorporated into the Near-Eye-Display (NED) device 400 described below, the environment-tracking API may enable one or more applications and/or an OS of the NED device 400 to track physical objects that surround the user wearing the NED device 400. Additionally, or alternatively, the environment-tracking API may enable one or more applications and/or an OS of the NED device 400 to track the user's hands to receive gesture-based computing inputs to control various aspects of a mixed reality experience.

Figure 2A:
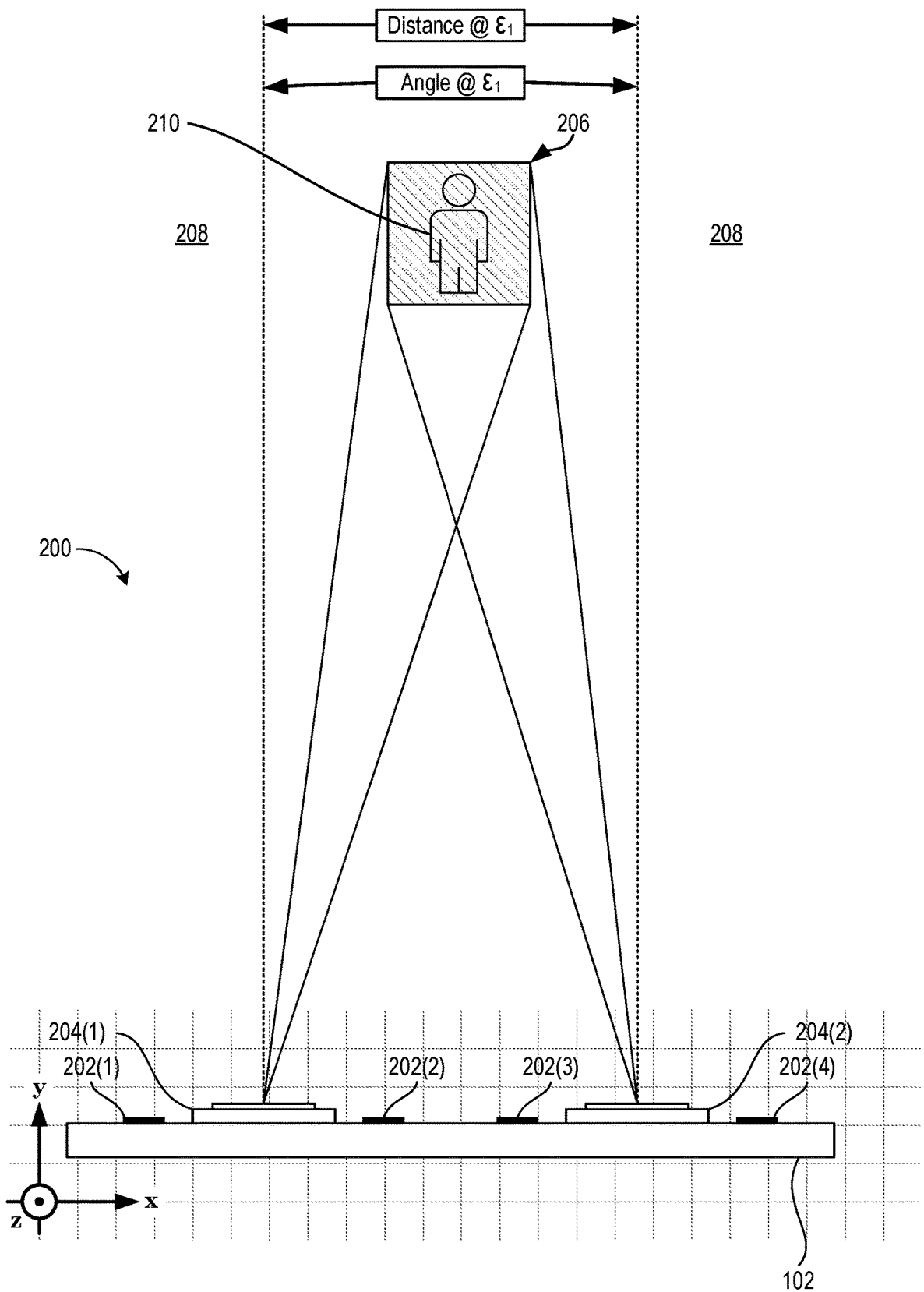
FIG. 2A is a side view of an exemplary system in which a support element is in a first strain state (61) while supporting first and second sensor components and having four strain gauges coupled thereto.

Turning now to FIG. 2A, illustrated is a side view of an exemplary system 200 in which a support element 102 is in a first strain state (61) while supporting a first sensor component 204(1) and a second sensor component 204(2). The system 200 also includes four strain gauges 202 mounted on the support element 102. The first strain gauge is labeled 202(1), the second strain gauge is labeled 202(2), and so on. The first strain gauge 202(1) through the fourth strain gauge 202(4) may be adhered to an outer surface of the support element at locations that are adjacent to individual sensor components 104. For example, each of the first strain gauge 202(1) through the fourth strain gauge 204(4) may be adhered to the surface of the support element 102 within close proximity to the sensor components (e.g., within 25 mm from a sensor, within 20 mm from a sensor, within 15 mm from a sensor, within 10 mm from a sensor, within 5 mm from a sensor, etc.).

In the illustrated example, the first sensor component 204(1) is configured to emit a structured pattern 206 of invisible light into a real-world environment 208. Some portion of the structured pattern 206 of invisible light is reflected off of an object 210 within the real-world environment 208 back to the second sensor component 204(2) which is configured to detect the reflected light. As a specific but non-limiting example, the first sensor component 204(1) may be a projector that emits a known pattern of structured light and the second sensor component 204(2) may be an image sensor such as a complementary metal-oxide-semiconductor (CMOS) element that detects reflections of the structured light. The system 200 may calculate 3D scene information based upon how the structured pattern 206 is deformed by the object 210 from the perspective of the second sensor component 204(2). As described above, the accuracy with which the calculated 3D scene information represents the actual physical characteristics of the object 210 is dependent upon the precision with which a positional relationship between sensor components (e.g., a projector and image sensor) is known. This is because this positional relationship typically needs to be accommodated for in the algorithms used to implement the environmental-tracking functionality. Accordingly, the controller (not shown in FIG. 2A) may receive strain data from the strain gauges 202 and use this strain data to account for the real-time positional relationship between the sensor components 204 in performance of the environment-tracking functionality. Specifically, based on the strain data, the controller may determine that the support element 102 is in a first strain state ($\varepsilon_1$). In some embodiments, the controller then determines that the first strain state ($\varepsilon_1$) results in the first sensor component 204(1) being at a particular angular offset from the second sensor component 204(2). Additionally, or alternatively, the controller determines that the first strain state ($\varepsilon_1$) results in the first sensor component 204(1) being spaced a particular distance apart from the second sensor component 204(2). Ultimately, the controller accommodates in real-time for the current angular offset and/or linear distance between the first sensor component 204(1) and the second sensor component 204(2).

Figure 2B:
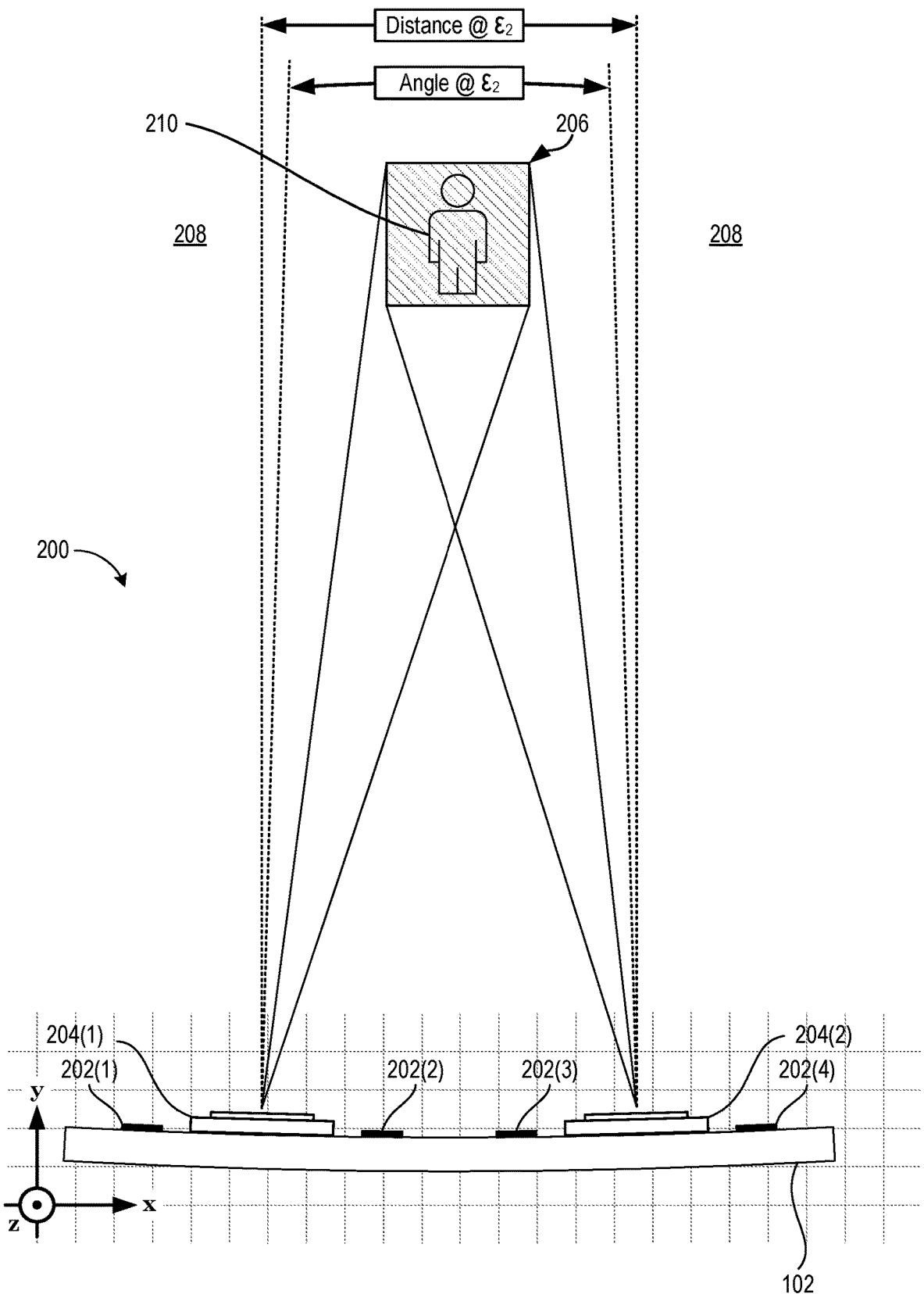
FIG. 2B is a side view of the system of FIG. 2A in which the support element has been mechanically and/or thermally stressed so as to induce a second strain state (82) into the support element.

In order to clearly illustrate the difference in the strain states that the system 200 is in between FIGS. 2A and 2B, in each of these figures the system 200 is superimposed over a reference grid that is identically located and sized in FIGS. 2A and 2B. Thus, in FIG. 2A it can be appreciated that the support element 102 is substantially flat in the sense that the outer surfaces of the support element 102 are parallel with grid lines within the reference grid. In contrast, in FIG. 2B it can be appreciated that the support element 102 is bent or deformed from the state shown in FIG. 2A.

Turning now to FIG. 2B, illustrated is a side view of the exemplary system 200 of FIG. 2A in which the support element 102 has been mechanically and/or thermally stressed (e.g., loaded) so as to induce a second strain state (82) into the support element 102. As illustrated, the first sensor component 204(1) continues to emit the structured pattern 206 of invisible light into the real-world environment 206. Similar to FIG. 2A, some portion of the structured pattern 206 of invisible light is reflected off of an object 210 within the real-world environment 206 back to the second sensor component 204(2) which is configured to detect the reflected light. Thus, the system 200 may still calculate 3D scene information based upon how the structured pattern 206 is deformed by the object 210. However, in doing so the system 200 accurately accounts for the new and current positional-relationship between the first sensor component 204(1) and the second sensor component 204(2).

Accordingly, the controller (not shown in FIG. 2B) continues to receive strain data from the strain gauges 202 and uses this strain data to account for the real-time positional relationship between the sensor components 204 in performance of environment-tracking functionality. For example, the controller may determine that the support element 102 is in the second strain state (82) based on the strain data. In some embodiments, the controller then precisely determines a new "real-time" or "current" angular offset between the first sensor component 204(1) and the second sensor component 204(2) that results from the second strain state (82). Additionally, or alternatively, the controller then precisely determines a new "real-time" or "current" linear distance between the first sensor component 204(1) and the second sensor component 204(2) that results from the second strain state (82). Ultimately, the controller accommodates in real-time for the current angular offset and/or linear distance between the first sensor component 204(1) and the second sensor component 204(2).

Figure 3:
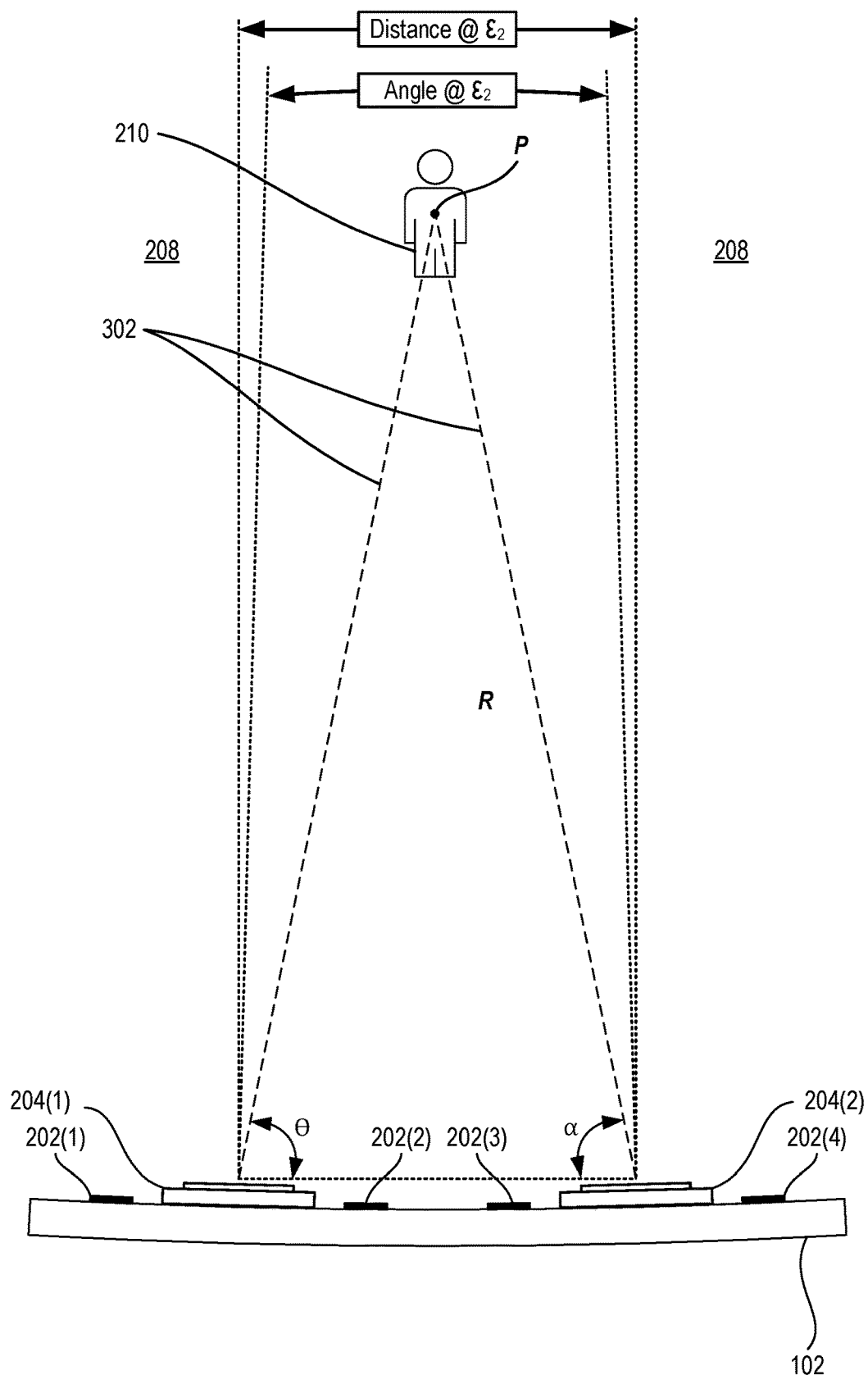
FIG. 3 is a side view of the system of FIGS. 2A & 2B showing an exemplary light path that is emitted by a first sensor component and is sensed by a second sensor component while the support element has been mechanically and/or thermally stressed so as to induce a second strain state (82) into the support element.

FIG. 3 is a side view of the system 200 showing an exemplary light path 302 that is emitted by a first sensor component 204(1) and is sensed by a second sensor component 204(2) while the support element has been mechanically and/or thermally stressed so as to induce a second strain state (82) into the support element. Under circumstances in which the positional-relationship between the first sensor component 204(1) and the second sensor component 204(2) is continuously and actively monitored, the exemplary light path 302 may be usable to calculate a location of a point (labeled P in FIG. 3) in the real-world environment 208. It can be appreciated that by calculating hundreds or even thousands of points in this way three-dimensional (3D) scene information (e.g., point cloud data) may be compiled that represents the real-world environment 208.

As illustrated, the light path 302 is emitted from the first sensor component 204(1) at a first angle (labeled θ in FIG. 3) and propagates through the real-world environment 208 until striking the object 210 which reflects some of the light back toward the second sensor component 204(2). The second sensor component 204(2) may sense a second angle (labeled a in FIG. 3) at which a reflected portion of the emitted light strikes the second sensor 204(2). Assuming the nominal distance and nominal angle are both maintained between the sensor components 204, an exemplary equation for calculating the distance (labeled R in FIG. 3) to the point P is as follows.

$$R = \text{Distance}@\varepsilon_2 \times \frac{\sin(\theta)}{\sin(\alpha + \theta)} \quad \text{(Eq. 1)}$$

It can be appreciated however that the foregoing may yield inaccurate information if either one or both of the real-time distance and/or angle between the sensor components 204 becomes unknown. Accordingly, various embodiments of the systems disclosed herein are designed to actively monitor the strain in the support element 102 and, therefrom, determine the real-time distance and/or angle between the sensor components 204.

In some embodiments, the system 100 and/or the system 200 may be integrated into a wearable electronic device to map the real-world environment while the wearable electronic device is mounted to a body part of a user. For example, as described below in relation to FIG. 4, the system 100 and/or the system 200 may be integrated into a Near-Eye-Display (NED) device 400. In some implementations, stresses that result from mounting the wearable electronic device to the body part of the user may induce at least a portion of the strain into the support element. For example, a user securing a head strap of the NED device 400 onto their head may cause some mechanical stresses that permeate throughout the NED device 400 and, ultimately, place some stress on the support element.

Figure 4:
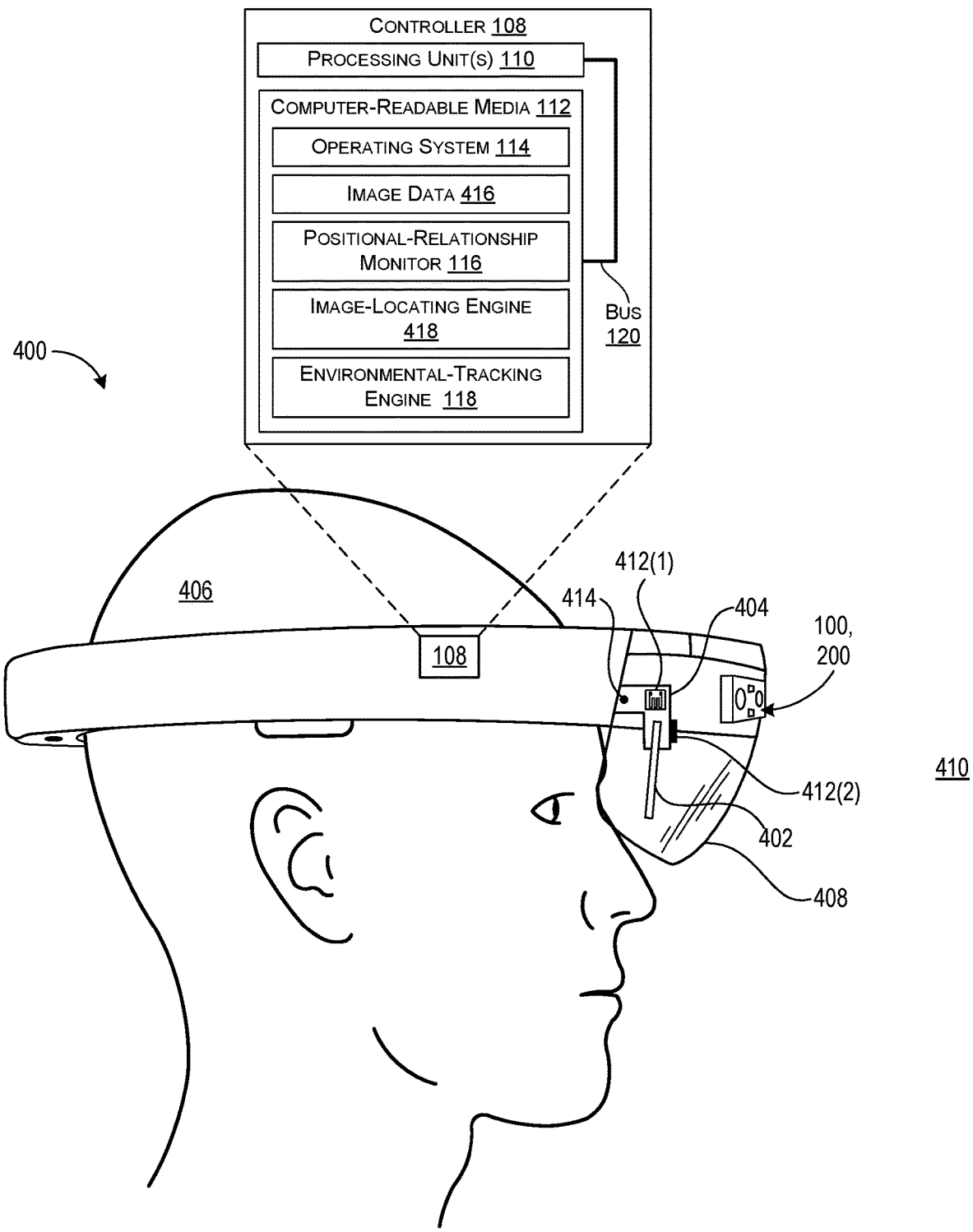
FIG. 4 illustrates an exemplary Near-Eye-Display (NED) device that actively accommodates for a real-time position of a display component with respect to locating computer generated images (CGIs) within a user's field-of-view (FOV).

Turning now to FIG. 4, illustrated is an exemplary Near-Eye-Display (NED) device 400 that actively accommodates for a real-time position of a display component 402 with respect to locating computer generated images (CGIs) within a user's field-of-view (FOV). As shown in FIG. 4, the NED device 400 includes one or more support elements 404 that support the display component 402 within the FOV of the user 406.

In some embodiments, the display component 402 may be a waveguide display that includes one or more diffractive optical elements (DOEs) for in-coupling light from a light engine (e.g., a computer controlled light source) and out-coupling the light toward the user's eyes. It will be appreciated by one skilled in the art that the in-coupling DOEs may transmit light from the light engine toward one or more light expanding DOEs that expand the received light in one or more directions for exit pupil expansion. Once the light is appropriately expanded, the out-coupling DOEs may direct the light toward the user's pupils. In some examples, the NED device 400 may further include an additional see-through optical component, shown in FIG. 4 in the form of a transparent veil 408 positioned between the real-world environment 410 (which real-world environment makes up no part of the claimed invention) and the display component 402. It can be appreciated that the transparent veil 408 may be included in the NED device 400 for purely aesthetic and/or protective purposes. The NED device 400 may further include various other components, for example speakers, microphones, accelerometers, gyroscopes, magnetometers, temperature sensors, touch sensors, biometric sensors, other image sensors, energy-storage components (e.g. battery), a communication facility, a GPS receiver, etc.

The one or more support elements 404 may be configured to maintain the display component 402 at an optimal position within the user's FOV when the NED device 400 is being properly worn by the user. In various embodiments, the support element 404 may be a homogeneous metallic alloy, a carbon fiber reinforced polymer (CFRP), or any other suitable material. Thus, as described with respect to FIGS. 1-3, as the support element 404 is mechanically and/or thermally loaded well-being worn by the user 406, the support element 404 may fluctuate between a variety of strain states. Thus, even if the NED device 400 remains securely mounted to the user's head, the mechanical and/or thermal stresses that the NED device 400 is subjected to during normal operation may strain the support element 404 such that the positioning of the display component within the user's FOV does not remain constant. It will be appreciated by one skilled in the art of NED devices that do to anatomical limitations regarding how the eyes receive light, even slight movements of the display component 402 with respect to the user's eyes may cause displayed imagery to become misplaced or even imperceptible to the user. Thus, it may be appreciated that the display component 402 is positionally sensitive in the sense that its relative position to the user's eyes at least partially affects how the user perceives CGIs as they are generated by the NED device 400.

The NED device 400 shown in FIG. 4 further includes one or more displacement sensors 412 that generate displacement data indicating how the positional relationship of the display component 402 to some predetermined reference node 414 fluctuates during operation. In the illustrated embodiment, the one or more displacement sensors 106 include two strain gauges that are disposed at two different locations of the support element 404. As described above, the strain gauges are mechanically coupled to the support element 102 in a manner so as to undergo stresses and strains along with the support element 102.

In some embodiments, the predetermined reference node 414 may be a point of the NED device 400 that is known to remain relatively static with respect to the user's head during operation. For example, the predetermined reference node 414 may correspond to a portion of the NED device 400 that presses tightly against the user's *glabella* when properly worn by the user. In this way, the predetermined reference node 414 can be presumed to not slip, wobble, or otherwise fluctuate positionally with respect to the user's *glabella*. Thus, using the presumption that the reference node 414 remain static with respect to the *glabella*, displacement data that is generated by the one or more displacement sensors 412 may be used to mathematically determine how the position of the display component fluctuates with respect to the user's *glabella* and/or field-of-view during operation.

As further illustrated in FIG. 4, the NED device 400 also includes the controller 108 which is communicatively coupled to the displacement sensors 106 and one or more of the display component 402. The controller 108 includes one or more logic devices and one or more computer memory devices storing instructions executable by the logic device(s) to accommodate in real-time for changes in the positional-relationship between one or more positionally sensitive components while performing complex functionality. For example, the controller 108 may actively and dynamically accommodate for the positional relationship of the display component 402 with respect to the reference node 414 while generating CGIs within the FOV of the user. As shown in FIG. 4, the controller 108 may include one or more processing units 110, one or more computer-readable media 112 for storing an operating system 114, image data 416, a positional-relationship monitor 116, an image-locating engine 418, and an environmental tracking engine 118. The components of the NED device 400 are operatively connected, for example, via a bus 120, which can include one or more of a system bus, a data bus, an address bus, a PCI bus, a Mini-PCI bus, and any variety of local, peripheral, and/or independent buses.

The positional-relationship monitor 116 may receive the displacement data from the displacement sensors 412 and may analyze this displacement data to determine the current positional-relationship between various positionally sensitive components and one or more reference nodes. In the illustrated example, the positional-relationship monitor 116 may analyze the displacement data to actively monitor a positional relationship of the display component 402 with respect to the reference node 414. Similar to as described in relation to FIG. 1, the displacement sensors 412 may include one or more strain gauges that generate displacement data in the form of an electrical resistance measurement that is indicative of an amount of strain that is currently present within the support element 404.

Based on the positional relationship of the display component 402 with respect to the reference node 414, an image-locating engine 418 may precisely locate computer-generated images (CGIs) on the display component 402. For example, the image locating engine 418 may receive image data 416 that defines one or more particular CGI's that are to be displayed to the user via the display component 402. The image data 416 may indicate location parameters associated with placing individual CGI's within the FOV of the user. Then, based on the location parameters that are extracted from the image data 416 and the real-time positional relationship between the display component 402 and the reference node 414, the image locating engine 418 may determine a particular location of the display component to render particular CGIs so as to optimize the stability and placement of each individual CGI within the FOV of the user. Ultimately, the controller 108 may deploy both of the positional relationship monitor 116 in the image locating engine 418 together to generate projections of particular CGIs at precise locations on the display component 402 that are determined based upon both location parameters extracted from image data 416 and the fluctuating real-time position of the display component with respect to some predetermined reference node 414.

As further illustrated in FIG. 4, in various embodiments the NED device 400 further includes the system 100 illustrated in FIG. 1 and/or the system 200 illustrated in FIGS. 2A and 2B incorporated therein. Accordingly, it can be appreciated that any and all functionality described with relation to anyone of FIG. 1-3 may be fully performed by the NED device 400.

Figure 5:
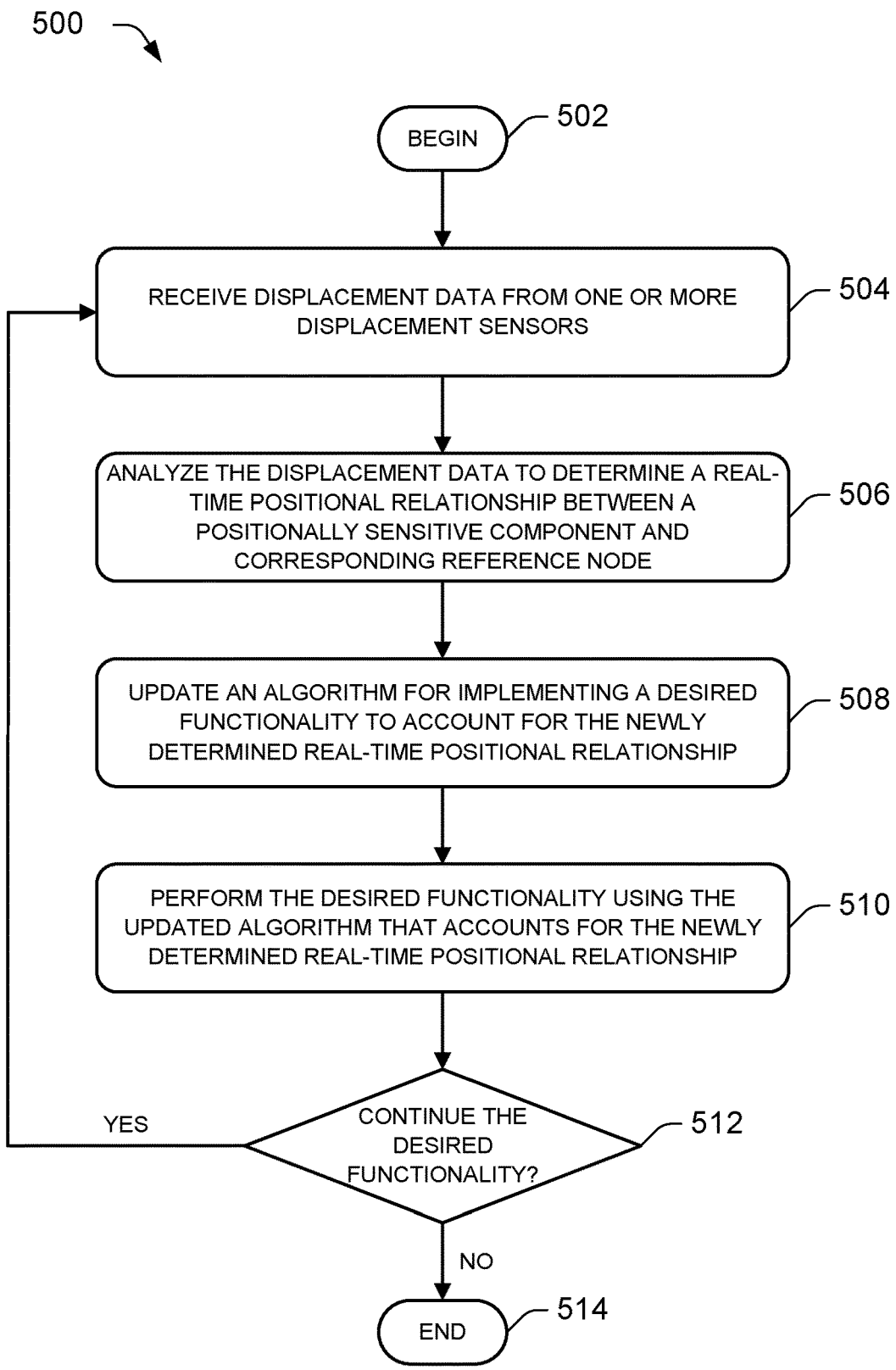
FIG. 5 is a flow diagram of a process to accommodate for a real-time positional relationship between positionally sensitive components while conjunctively deploying the positionally sensitive components.
Figure 6:
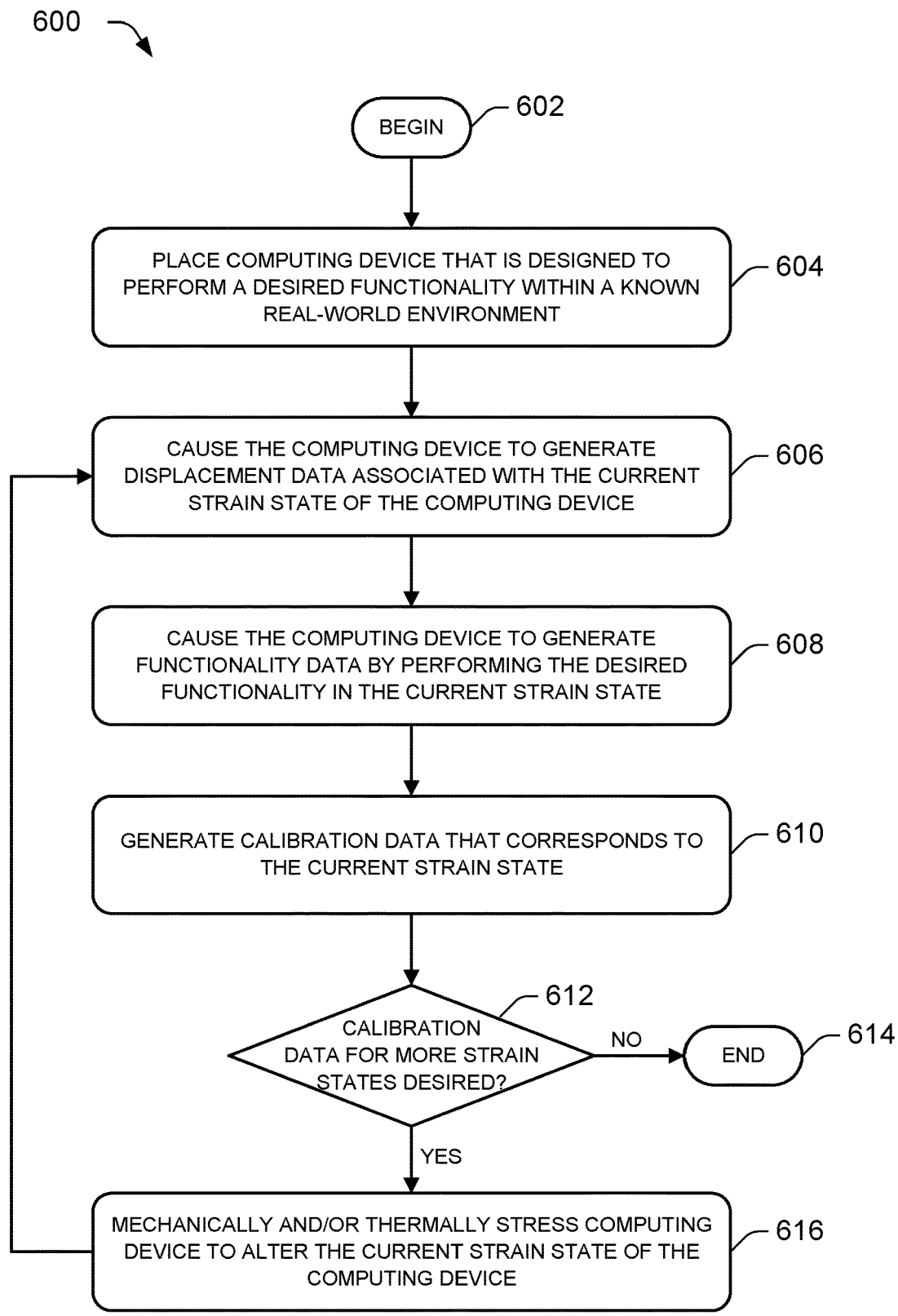
FIG. 6 is a flow diagram of a process for calibrating a computing device that is designed to implement a desired functionality by conjunctively deploying positionally sensitive components for which a real-time positional relationship may fluctuate during operation.

FIGS. 5 through 7 illustrate example flowcharts for computer-implemented methods of performing various aspects of the techniques described herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-executable instructions included on a computer-storage media, as defined herein. The term "computer-executable instructions," and variants thereof, as used in the description and claims, is used expansively herein to include routines, applications, application modules, program modules, programs, components, data structures, algorithms, and the like. Computer-executable instructions can be implemented on various system configurations, including single-processor or multiprocessor systems, minicomputers, mainframe computers, personal computers, hand-held computing devices, microprocessor-based, programmable consumer electronics, combinations thereof, and the like.

FIG. 5 is a flow diagram of a process 500 to accommodate for a real-time positional relationship between positionally sensitive components while conjunctively deploying the positionally sensitive components. It will be appreciated that the process 500 enables a computing device to deploy positionally-related components in conjunction with one another to implement a desired functionality notwithstanding fluctuations in the real-time positional relationship during operation of the computing device. For example, in some implementations, the process 500 may enable a computing device to implement a stereo vision functionality using two positionally related cameras. Such an implementation could include actively monitoring a linear separation/distance between the two positionally related cameras and continuously updating an algorithm that uses a pixel disparity for a point within the real-world scene between respective images (one taken with each camera) to calculate a distance to that point. In some implementations, the process 500 may enable a computing device to implement a structured light environmental-mapping functionality as described herein.

At block 502, a computing device begins to implement the process 500.

At block 504, a computing device receives displacement data from one or more displacement sensors. As described above, the displacement data may correspond to one or more signals that are indicative of a real-time positional relationship between one or more positionally sensitive components and one or more corresponding reference nodes. In some embodiments, a reference node for a first positionally sensitive component may be a second positionally sensitive component that the first positionally sensitive component is deployed in conjunction with. For example, in an implementation in which the first and second positionally sensitive components correspond to the projector and image sensor as described in relation to FIG. 3, then the projector may serve as the reference node for the image sensor. In some embodiments, the reference node for a positionally sensitive component may be a portion of a wearable device that remains relatively static with respect to a body part of a user during operation. For example, the reference node may be selected as a portion of a support element that is adjacent to a head band that is tightly strapped to a user's head during operation of the computing device.

At block 506, the computing device may analyze the displacement data to determine the real-time positional relationship between the positionally sensitive components and corresponding reference nodes. For example, in an implementation in which the one or more displacement sensors include one or more strain gauges such that the displacement data corresponds to a resistance measurement taken across the one or more strain gauges, then the computing device may use such resistance measurement to calculate a precise amount of strain that the one or more strain gauges are currently experiencing. It will be appreciated that since the strain gauges may be adhered to and/or embedded within a support element that is supporting the one or more positionally sensitive components, the precise amount of strain that is induced into the one or more strain gauges is commensurate with the precise amount of strain that is induced into the support element. It will further be appreciated that knowledge of the amount of strain induced into the support element can be used to mathematically calculate, with a high level of precision, the real-time positional relationship between the positionally sensitive components.

At block 508, the computing device may update one or more algorithms, that are usable to implement the desired functionality, to account for the newly determined real-time positional relationship between the positionally sensitive components and corresponding reference nodes. For example, in an implementation in which the positionally related components include two or more positionally related sensor components that are deployable in conjunction with one another to implement the structured light environmental-mapping functionality described herein in relation to FIG. 3, the computing device may update one or more algorithms (e.g., Equation 1 from above) that are used to implement the structured light environmental-mapping functionality so that the algorithms accommodate for the newly determined real-time positional relationship between the two or more positionally related sensor components. As another example, in an implementation in which the positionally related component is a display component as described in relation to FIG. 4, the computing device may update one or more algorithms that are used to locate computer-generated images with respect to the display component. In this way, even as the placement of the display component fluctuates within the user's field-of-view due to the level of strain in the support element fluctuating as a result of changing thermal and/or mechanical stresses, the computing device can actively monitor and account for such fluctuations when projecting CGIs within the user's field-of-view.

At block 510, the computing device may perform the desired functionality using the updated algorithms that account for the newly determined real-time positional relationship. For example, as described herein the computing device may perform environmental tracking functionality using updated environmental tracking algorithms to generate highly accurate 3D scene information representing a real-world environment even as to a more positionally related sensor components (e.g., a projector and an image sensor) slightly move and/or rotate with respect to one another due to support element loading.

At block 512, the computing device determines whether to continue performing the desired functionality. If performing the desired functionality is to continue, then the process 500 loops back to block 504 and again proceeds to perform the operations described above in relation to blocks 504 through 510. If performing the desired functionality is to end, then the process 500 proceeds to block 514 and is terminated.

In various implementations of the process 500, the loop that flows from block 504 through block 512 and then back to block 504 if the desired functionality is to continue may occur at a predetermined frequency. For example, in some implementations, this loop may occur at: a frequency greater than 0.1 hertz (Hz) such that the process repeats at least every 10 seconds; a frequency greater than 0.2 hertz (Hz) such that the process repeats at least every 5 seconds; a frequency greater than 0.5 hertz (Hz) such that the process repeats at least every 2 seconds; or a frequency greater than 1 hertz (Hz) such that the process repeats at least every 1 seconds. In some implementations, the loop may occur at a frequency that is greater than 1 MHz, 10 MHz, 20 MHz, 30 MHz, 40 MHz, 50 MHz, and so on.

FIG. 6 is a flow diagram of a process 600 for calibrating a computing device that is designed to implement a desired functionality by conjunctively deploying positionally sensitive components for which a real-time positional relationship may fluctuate during operation. For example, the process 600 may be used to calibrate one or more of the systems 100, 200, and/or 400 to perform any of the functionalities described in relation thereto.

At block 602, the process 600 begins.

At block 604, the computing device that is designed to implement the desired functionality is placed within a known real-world environment. For example, the computing device may be affixed to a robotic arm within a room that has one or more known patterns painted onto one or more walls. Additionally, or alternatively, the known real-world environment may include one or more three-dimensional objects with known dimensions and/or color parameters. It will be appreciated that such known real-world environments are commonly used to calibrate environmental tracking systems that are designed to map a real-world environment using a variety of technologies such as, for example, structured light and/or stereo vision. It will further be appreciated that calibration of such devices may be desired due to limitations with respect to manufacturing process precision. For example, modern manufacturing processes are subject to geometrical tolerances and, therefore, placing two positionally related components precisely at a nominal positional relationship is respect to one another may be impractical.

At block 606, the computing device may be caused to generate displacement data associated with a current strain state of the computing device. For example, the positionally sensitive components may be mounted to a support element as described herein such that the real-time positional relationship between the positionally sensitive components may fluctuate as the strain state of the computing device fluctuates.

At block 608, the computing device may be caused to generate functionality data by performing the desired functionality within the known real-world environment in which it is placed and while at the current strain state. For example, in an implementation in which the desired functionality corresponds to an environmental tracking functionality, the computing device may be caused to generate tracking data within the real world environment while at the current strain state.

At block 610, calibration data is generated that corresponds to the current strain state of the computing device. For example, the calibration data may be generated by comparing measured depth values that are generated in association with the environmental tracking functionality and then comparing these measured depth values to known depth values corresponding to the known real-world environment in which the computing devices placed.

At block 612, it is determined whether additional calibration data is desired for more strain states of the computing device. If calibration data for additional strain states is not desired, then the process 600 proceeds to block 614 and is terminated. However, if calibration data is desired for additional strain states, than the process 600 proceeds to block 616 at which the computing device is subjected to mechanical indoor thermal stress to alter the current strain state of the computing device. For example, the computing device and/or individual components thereof may be mechanically loaded so as to induce bending and/or other types of strain. Additionally, or alternatively, the computing device may be subjected to heat and/or cold so as to induce strain into the computing device based on a coefficient of thermal expansion.

After the computing device is mechanically interfamily stressed to alter the current strain state of the computing device, then the process 600 loops back to block 606 and again proceeds to perform the operations described above in relation to blocks 606 through 616. The process 600 may loop repeatedly until numerous individual instances of calibration data have been generated in association with numerous different individual strain states of the computing device. In this way, rather than merely calibrating a computing device in association with a single nominal positional relationship between two or more positionally sensitive components, the process 600 enables a computing device to be calibrated in association with tens, hundreds, or even thousands of different strain states that all result in different positional relationships between the two or more positionally sensitive components.

Subsequently, following calibration of the computing device via the process 600 and while a user is deploying the computing device in a real-world practical application in which the positional relationship between the positionally sensitive components may fluctuate, the computing device may generate new displacement data and determined that the current strain state of the computing device during the real-world practical application closely matches the current strain state of the computing device for which the calibration data was generated at block 610. Accordingly, based on the close resemblance of the real-time strain state to the strain state from calibration, the computing device may select appropriate calibration data to use for any moment during the real-world practical application.

As a specific but nonlimiting example, the process 600 may be applied to the system 100 by causing the sensor assembly to output a plurality of instances of tracking data in association with a plurality of different strain levels that are all mechanically induced into the support element that supports the positionally sensitive components of the system 100. Then, individual instances of the plurality of incidences of the tracking data may be correlated to individual instances of the plurality of instances of strain data that are indicative of the plurality of different strain levels that are mechanically induced into the sport during the process 600. Ultimately, calibration data may be generated at the different strain levels and compiled for use during a real-world practical application.

It should be appreciated any reference to "first," "second," etc. items and/or abstract concepts within the description is not intended to and should not be construed to necessarily correspond to any reference of "first," "second," etc. elements of the claims. In particular, within this Detailed Description and/or the previous Summary, items and/or abstract concepts such as, for example, different positionally-related sensor components may be distinguished by numerical designations without such designations corresponding to the claims or even other paragraphs of the Summary and/or Detailed Description. For example, any designation of a "first sensor components" and "second sensor components" within a paragraph of this disclosure is used solely to distinguish two different sensor components within that specific paragraph—not any other paragraph and particularly not the claims.

FIGS. 1-6 illustrate various alternate embodiments of the system(s) disclosed herein. Specific details being illustrated in the FIGS (and/or described in the Summary or Detailed Description) with another specific detail or, alternatively, apart from another specific detail is not intended to be construed as a limitation. Thus, any individual detail illustrated in and/or described with respect to any figure herein may be combined in any practicable manner with any other individual detail illustrated in and/or described with respect to any other figure herein.

The presently disclosed techniques are believed to be applicable to a variety of systems and approaches involving accommodating for real-time fluctuations in a positional relationship between positionally sensitive components that are deployed to implement desired functionalities. Aspects of this disclosure are predominantly disclosed in the context of a support element that undergoes mechanical and/or thermal stress during normal operation being used to support to positionally-related sensor components to implement a structured light environmental tracking functionality. While the presently disclosed techniques are not necessarily limited to these specific implementation details, an appreciation of various aspects of the disclosed techniques is best gained through a discussion of examples in the aforementioned contexts.

EXAMPLE CLAUSES

The disclosure presented herein may be considered in view of the following clauses.

Example Clause A, system comprising: a sensor assembly that includes a first sensor component that is mounted to a support element and a second sensor component that is mounted to the support element; one or more strain gauges mechanically coupled to the support element; at least one controller that is communicatively coupled to the sensor assembly and the one or more strain gauges, wherein the at least one controller is configured to: receive, from the sensor assembly, tracking data that is generated by deploying the first sensor component in conjunction with the second sensor component in accordance with an environment-tracking function for mapping a real-world environment; receive, from the one or more strain gauges, strain data that is indicative of a real-time positional relationship between the first sensor component and the second sensor component that varies due to strain being induced into the support element; update the environment-tracking function based on the strain data to dynamically generate a real-time environment-tracking function that accounts for the real-time positional relationship between the first sensor component and the second sensor component; and generate mapping data using the real-time environment-tracking function and the tracking data, wherein the mapping data is dimensionally representative of the real-world environment.

Example Clause B, the system of Example Clause A, wherein the at least one individual strain gauge, of the one or more strain gauges, is disposed at a location of the support element that is between the first sensor component and the second sensor component.

Example Clause C, the system of any one of Example Clauses A through B, wherein the at least one individual strain gauge, of the one or more strain gauges, is disposed at a location of the support element that is within 20 millimeters from at least one of the first sensor component or the second sensor component.

Example Clause D, the system of any one of Example Clauses A through C, wherein the one or more strain gauges includes a plurality of individual strain gauges that are disposed across different locations to form a strain gauge array that at least partially surrounds at least one of the first sensor component or the second sensor component.

Example Clause E, the system of any one of Example Clauses A through D, wherein mapping the real-world environment is based, at least in part, on strain calibration data that is generated by: causing the sensor assembly to output a plurality of instances the tracking data in association with a plurality of strain levels that are mechanically induced into the support element, and correlating the plurality of instances of the tracking data to a plurality of instances of strain data that correspond to the plurality of strain levels that are mechanically induced into the support element.

Example Clause F, the system of any one of Example Clauses A through E, wherein the system is integrated into a wearable electronic device to map the real-world environment while the wearable electronic device is mounted to a body part of a user.

Example Clause G, the system of any one of Example Clauses A through F, wherein the tracking data is generated by deploying the first sensor component to emit structured light into the real-world environment while contemporaneously deploying the second sensor component to detect a reflected portion of the structured light while the strain is being induced into the support element, thereby affecting the real-time positional relationship between the first sensor component and the second sensor component.

Example Clause H, the system of any one of Example Clauses A through G, wherein the tracking data is generated by deploying the first sensor component to capture first imagery of the real-world environment from a first vantage point while contemporaneously deploying the second sensor component to capture second imagery of the real-world environment from a second vantage point, wherein the first imagery and the second imagery are captured while the strain is being induced into the support element, thereby affecting the real-time positional relationship between the first sensor component and the second sensor component.

Example Clause I, the system of any one of Example Clauses A through H, wherein the at least one individual strain gauge, of the one or more strain gauges, is embedded within the support element onto which the first sensor component and the second sensor component are mounted.

Example Clause J, the system of any one of Example Clauses A through I, wherein the at least one controller is further configured to expose an environment-tracking application programming interface (API) to provide the mapping data to one or more applications.

Example Clause K, a Near-Eye-Display (NED) device, comprising: a display component that is configured to project computer generated images (CGIs) toward at least one eye of a user; one or more support elements that support the display component; one or more displacement sensors to generate displacement data that is indicative of a real-time positional relationship between the display component and at least one reference node; one or more processors; a memory in communication with the one or more processors, the memory having computer-readable instructions stored thereupon which, when executed by the one or more processors, cause the one or more processors to: receive image data that defines a particular CGI for display via the display component, wherein the image data indicates location parameters associated with placing the particular CGI within a field-of-view (FOV) of the user; receive, from the one or more displacement sensors, the displacement data that is indicative of the real-time positional relationship between the display component and the at least one reference node; determine a particular location of the display component to render the particular CGI based at least in part on: the location parameters, and the real-time positional relationship between the display component and the at least one reference node; and generate a projection of the particular CGI at the particular location of the display component.

Example Clause L, the NED device of Example Clause K, wherein the one or more displacement sensors include one or more strain gauges that are mechanically coupled to the one or more support elements that support the display component.

Example Clause M, the NED device of any one of Example Clauses K through L, wherein the at least one displacement sensor includes a plurality of strain gauges that are disposed across different locations of the one or more support elements that support the display component.

Example Clause N, the NED device of any one of Example Clauses K through M, wherein the at least one displacement sensor includes a plurality of strain gauges that are disposed across different locations of the one or more support elements that support the display component, and wherein the displacement data includes a plurality of instances of strain data that is generated via individual ones of the plurality of strain gauges.

Example Clause O, the NED device of any one of Example Clauses K through N, wherein the real-time positional relationship between the display component and the at least one reference node is refreshed at a time interval that does not exceed one-minute.

Example Clause P, the NED device of any one of Example Clauses K through O, wherein the displacement data is generated via at least one strain gauge that is embedded within the one or more support elements that support the display component.

Example Clause Q, a computer-implemented method, comprising: receiving displacement data from one or more displacement sensors coupled to one or more support elements, the displacement data indicating a real-time positional relationship between a first sensor component and a second sensor component; receiving tracking data from at least one of the first sensor component or the second sensor component, the tracking data generated in association with an environment-tracking function for mapping a real-world environment; and mapping the real-world environment based on: the displacement data indicating the real-time positional relationship between the first sensor component and the second sensor component, and the tracking data that is received from at least one of the first sensor component or the second sensor component.

Example Clause R, the computer-implemented method of Example Clause Q, wherein the displacement data corresponds to one or more electrical resistance measurements that are taken via one or more strain gauges that are mechanically coupled to the one or more support elements.

Example Clause S, the computer-implemented method of any one of Example Clauses Q through R, further comprising determining the real-time positional relationship between the first sensor component and the second sensor component based on the one or more electrical resistance measurements.

Example Clause T, the computer-implemented method of any one of Example Clauses Q through S, wherein instances of the displacement data are received at time intervals of less ten seconds so that the positional-relationship used in the mapping the real-world environment is measured less than ten seconds before being used to map the real-world environment.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system comprising:
a sensor assembly that includes a first sensor component that is mounted to a support element and a second sensor component that is mounted to the support element;
one or more strain gauges mechanically coupled to the support element;
at least one controller that is communicatively coupled to the sensor assembly and the one or more strain gauges, wherein the at least one controller is configured to:
receive, from the sensor assembly, tracking data that is generated by deploying the first sensor component in conjunction with the second sensor component;
receive, from the one or more strain gauges, strain data that is indicative of a positional relationship between the first sensor component and the second sensor component, wherein the positional relationship varies due to strain being induced into the support element;
determine, based on the strain data, a real-time environment-tracking function that accounts for the positional relationship, between the first sensor component and the second sensor component, in calculations of distances to an object within a real-world environment; and
generate, based on the real-time environment-tracking function and the tracking data, point cloud data that defines three-dimensional locations for a plurality of points that are dimensionally representative of the object within the real-world environment.

2. The system of claim 1, wherein at least one individual strain gauge, of the one or more strain gauges, is disposed at a location of the support element that is between the first sensor component and the second sensor component.

3. The system of claim 1, wherein at least one individual strain gauge, of the one or more strain gauges, is disposed at a location of the support element that is within 20 millimeters from at least one of the first sensor component or the second sensor component.

4. The system of claim 1, wherein the one or more strain gauges includes a plurality of individual strain gauges that are disposed across different locations to form a strain gauge array that at least partially surrounds at least one of the first sensor component or the second sensor component.

5. The system of claim 1, wherein generating the point cloud data is based, at least in part, on strain calibration data that is generated by:
    causing the sensor assembly to output a plurality of instances of the tracking data in association with a plurality of strain levels that are mechanically induced into the support element, and
    correlating the plurality of instances of the tracking data to a plurality of instances of strain data that correspond to the plurality of strain levels that are mechanically induced into the support element.

6. The system of claim 1, wherein the system is integrated into a wearable electronic device to map the real-world environment while the wearable electronic device is mounted to a body part of a user.

7. The system of claim 1, wherein the tracking data is generated by deploying the first sensor component to emit structured light into the real-world environment while contemporaneously deploying the second sensor component to detect a reflected portion of the structured light while the strain is being induced into the support element, thereby affecting the positional relationship between the first sensor component and the second sensor component.

8. The system of claim 1, wherein the tracking data is generated by deploying the first sensor component to capture first imagery of the real-world environment from a first vantage point while contemporaneously deploying the second sensor component to capture second imagery of the real-world environment from a second vantage point, wherein the first imagery and the second imagery are captured while the strain is being induced into the support element, thereby affecting the positional relationship between the first sensor component and the second sensor component.

9. The system of claim 1, wherein at least one individual strain gauge, of the one or more strain gauges, is embedded within the support element onto which the first sensor component and the second sensor component are mounted.

10. The system of claim 1, wherein the at least one controller is further configured to expose an environment-tracking application programming interface (API) to provide the mapping data to one or more applications.

11. A Near-Eye-Display (NED) device, comprising:
    a display component that is configured to project computer generated images (CGIs) toward at least one eye of a user;
    one or more support elements that support the display component;
    one or more displacement sensors to generate displacement data that is indicative of a real-time positional relationship between the display component and a reference node, wherein the reference node corresponds to a portion of the NED device that is configured to be mounted against a body part of the user to support the display component within a field-of-view (FOV) of the user;
    one or more processors;
    a memory in communication with the one or more processors, the memory having computer-readable instructions stored thereupon which, when executed by the one or more processors, cause the one or more processors to:
        receive image data that defines a particular CGI for display via the display component, wherein the image data indicates location parameters associated with placing the particular CGI within the field-of-view (FOV) of the user;
        receive, from the one or more displacement sensors, the displacement data that is indicative of the real-time positional relationship between the display component and the reference node;
        determine a particular location of the display component to render the particular CGI based at least in part on:
            the location parameters, and
            the real-time positional relationship between the display component and the reference node; and
        generate a projection of the particular CGI at the particular location of the display component.

12. The NED device of claim 11, wherein the one or more displacement sensors include one or more strain gauges that are mechanically coupled to the one or more support elements that support the display component.

13. The NED device of claim 11, wherein the at least one displacement sensor includes a plurality of strain gauges that are disposed across different locations of the one or more support elements that support the display component.

14. The NED device of claim 11, wherein the at least one displacement sensor includes a plurality of strain gauges that are disposed across different locations of the one or more support elements that support the display component, and wherein the displacement data includes a plurality of instances of strain data that is generated via individual ones of the plurality of strain gauges.

15. The NED device of claim 11, wherein the real-time positional relationship between the display component and the at least one reference node is refreshed at a time interval that does not exceed one-minute.

16. The NED device of claim 11, wherein the displacement data is generated via at least one strain gauge that is embedded within the one or more support elements that support the display component.

17. A computer-implemented method, comprising:
    receiving displacement data from one or more displacement sensors coupled to one or more support elements, the displacement data indicating a real-time positional relationship between a first sensor component and a second sensor component;
    receiving tracking data from at least one of the first sensor component or the second sensor component, the tracking data generated in association with an environment-tracking function for mapping a real-world environment; and
    generating point cloud data that defines three-dimensional locations for a plurality of points that are dimensionally representative of an object within the real-world environment, wherein the generating the point cloud data is based on:
        the displacement data indicating the real-time positional relationship between the first sensor component and the second sensor component, and
        the tracking data that is received from at least one of the first sensor component or the second sensor component.

18. The computer-implemented method of claim 17, wherein the displacement data corresponds to one or more electrical resistance measurements that are taken via one or more strain gauges that are mechanically coupled to the one or more support elements.

19. The computer-implemented method of claim 18, further comprising determining the real-time positional relationship between the first sensor component and the second sensor component based on the one or more electrical resistance measurements.

20. The computer-implemented method of claim 19, wherein instances of the displacement data are received at time intervals of less than ten seconds so that the positional-relationship used in the mapping the real-world environment is measured less than ten seconds before being used to map the real-world environment.

* * * * *